US006490879B1

(12) United States Patent
Lloyd et al.

(10) Patent No.: US 6,490,879 B1
(45) Date of Patent: Dec. 10, 2002

(54) WATER GENERATING MACHINE

(75) Inventors: Douglas J. Lloyd, Midvale, UT (US); Siegfried E. Baier, Salt Lake City, UT (US)

(73) Assignee: Assist International Marketing, Inc., Midvale, UT (US)

( * ) Notice: Subject to any disclaimer, the term of this patent is extended or adjusted under 35 U.S.C. 154(b) by 0 days.

(21) Appl. No.: 09/671,341

(22) Filed: Sep. 27, 2000

(51) Int. Cl.[7] ............................ F25D 21/14; F25B 21/02
(52) U.S. Cl. ............................................. 62/291; 62/3.4
(58) Field of Search ........................ 62/291, 272, 275, 62/3.4, 285, 121, 271, 123, 467, 92; 210/175

(56) References Cited

U.S. PATENT DOCUMENTS 5,259,203 A * 11/1993 Engel et al. .............. 62/291 X
5,669,221 A * 9/1997 LeBleu et al. ............ 62/285 X
5,845,504 A * 12/1998 LeBleu .................... 62/285 X

* cited by examiner

Primary Examiner—Chen-Wen Jiang
(74) Attorney, Agent, or Firm—TraskBritt, P.C.

(57) ABSTRACT

This invention is directed to a water generating apparatus for extracting water from ambient air. The apparatus provides a condensing surface which is maintained during the operation of the apparatus at a temperature which is below the dew point of the ambient air. The presence of contaminants within the extracted water are reduced by filtering the ambient air prior to its processing by the apparatus and subsequently filtering the condensate. The apparatus is constructed from components which produce minimal particulate matter. The use of such components minimizes the likelihood of those components contributing to the contamination of the water generated from the apparatus. Bacteriological contamination in the condensed water is reduced by constructing the apparatus from components that retard bacteria growth. Further diminution of bacterial growth is achieved by maintaining a continuous flow of water condensate through the apparatus.

22 Claims, 12 Drawing Sheets

WATER GENERATING MACHINE

BACKGROUND OF THE INVENTION

1. Field of the Invention

This invention relates to devices adapted for extracting water from ambient air. More specifically, this invention is directed to a device for extracting potable water from the environment for human use.

2. State of the Art

Potable water is essential for human survival. In many environments, access to readily available sources of drinkable water is restricted if not precluded. Efforts have been made in the past to provide structures adapted to extract potable water from the environment, notable ambient air. Representative structures are those disclosed in U.S. Pat. No. 5,845,504 (LeBleu); U.S. Pat. No. 5,259,203 (Engel et al. And U.S. Pat. No. 5,669,221 (LeBleu et al). While the aforesaid structures have contributed notably to the development of solutions to the provision of potable water in hostile environments, there continues to be a need for a device which is capable of providing a supply of potable water which is free of contaminants.

BRIEF SUMMARY OF THE INVENTION

A water generating device for producing potable water from ambient air according to the instant invention includes a housing having a first compartment, a second compartment and a third compartment. A water condensing surface is positioned within the first compartment. The device further includes a cooling apparatus which is associated with the condensing surface for cooling the condensing surface to a temperature below the dew point of the ambient air. A water collector is associated with the condensing surface for collecting water from the condensing surface. A first water storage reservoir is connected to the water collector. The first water storage reservoir is positioned in the second compartment. An air filter structure is positioned about the water condensing surface to enclose the water condensing surface thereby forming a filter barrier surrounding the water condensing surface. The air filter structure isolates the water condensing surface from air within the first compartment.

In an alternative construction of the invention, the device may include an air circulating device which may be disposed between the water condensing surface and the air filter structure. This air circulating device may be positioned in the third compartment. This third compartment may be thermally isolated from the first compartment.

Alternative constructions may further provide for the isolation of the first compartment from the second compartment. This isolation may be of a thermal character or alternatively, the isolation may be such as to preclude unfiltered air from passing from the first compartment to the second compartment.

In yet another construction the device may include a second water storage reservoir which may be interconnected to the first water storage reservoir. The interconnection of this second water storage reservoir to the first water storage reservoir may include a check valve positioned intermediate the first water storage reservoir and the second water storage reservoir.

The invention is also directed to a method of producing potable water from ambient air. The method includes the steps of providing a water condensing surface and isolating the water condensing surface from the environment by enclosing the surface with an air filtering apparatus. The method further includes the step of providing a cooling apparatus in association with the water condensing surface for cooling the water condensing surface to a temperature below the dew point of ambient air and associating the water collector with the water condensing surface for collecting water from the water condensing surface. The method further includes the steps of drawing ambient air through the air filtering apparatus by means of an air circulating apparatus while cooling the water condensing surface by means of the cooling apparatus and then drawing the ambient air our of the air filtering apparatus by means of the air circulating apparatus. Accordingly, air exiting the air filtering apparatus is filtered upon exiting the air filtering apparatus.

The claimed method may, in alternative embodiments, include the step of providing a compartment about the water collector and thermally isolating the compartment from the cooling apparatus. The method may also include the step of providing a water collector fabricated from a silver ion anti-bacterial material.

Alternative embodiments of the method may also include the step of filtering the water in the water collector by passing the water sequentially through a charcoal filter and subsequently through a sediment filter and a sanitation light.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
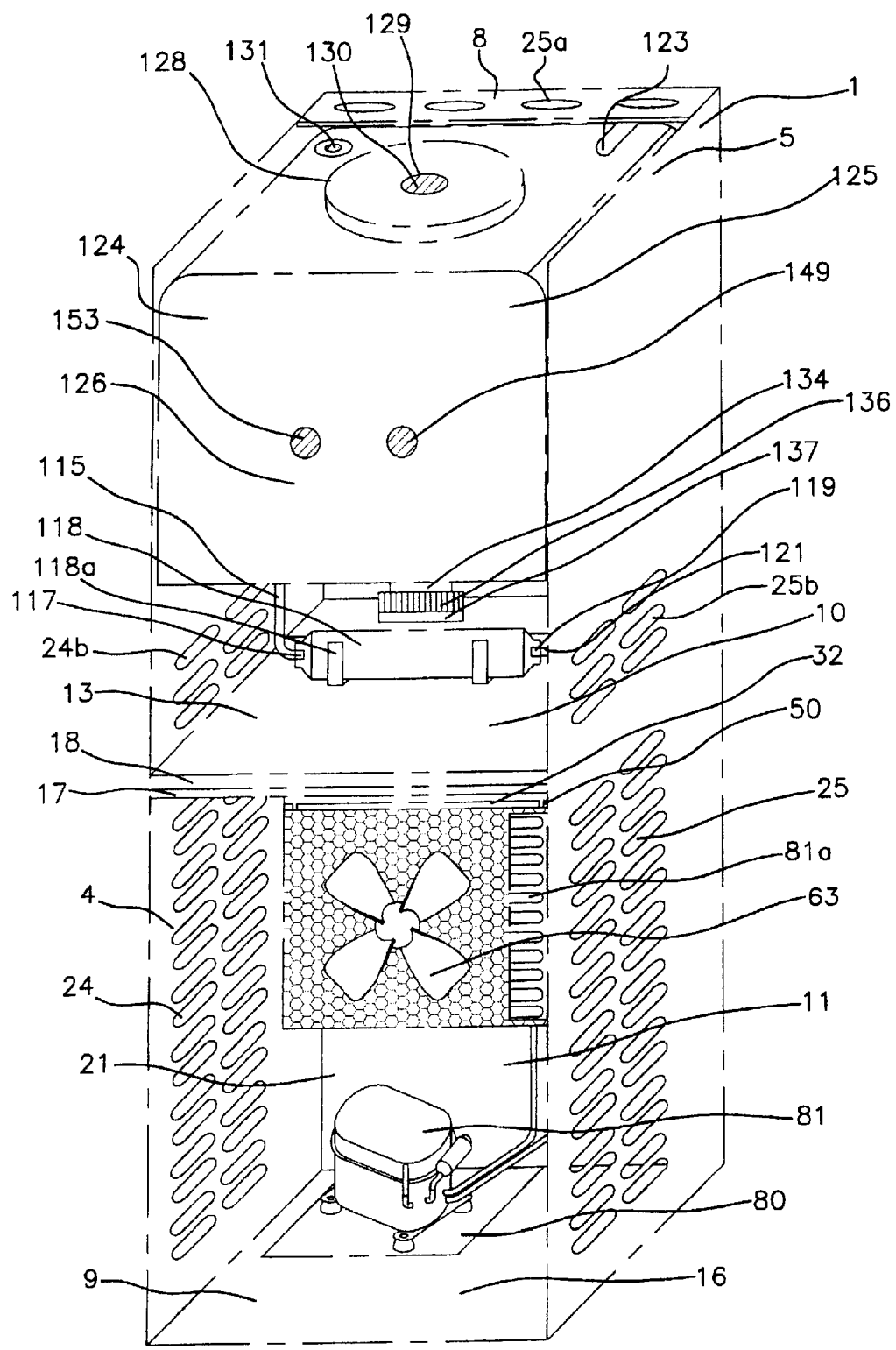
FIG. 1 is a perspective front view of the water generating machine with the front panel and top panel removed.
Figure 2:
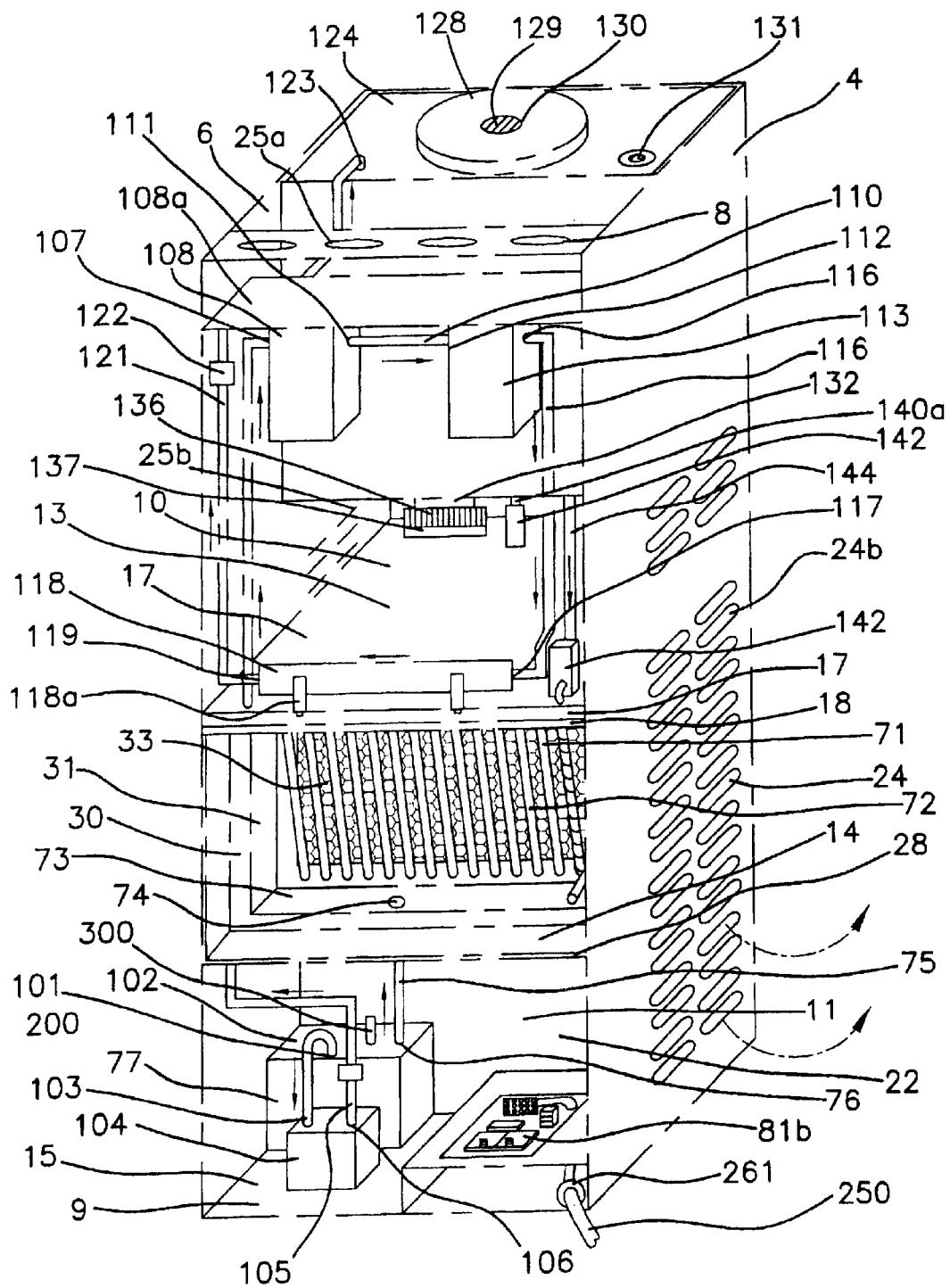
FIG. 2 is a perspective rear view of the water generating machine with the rear panel and top panel removed.
Figure 3:
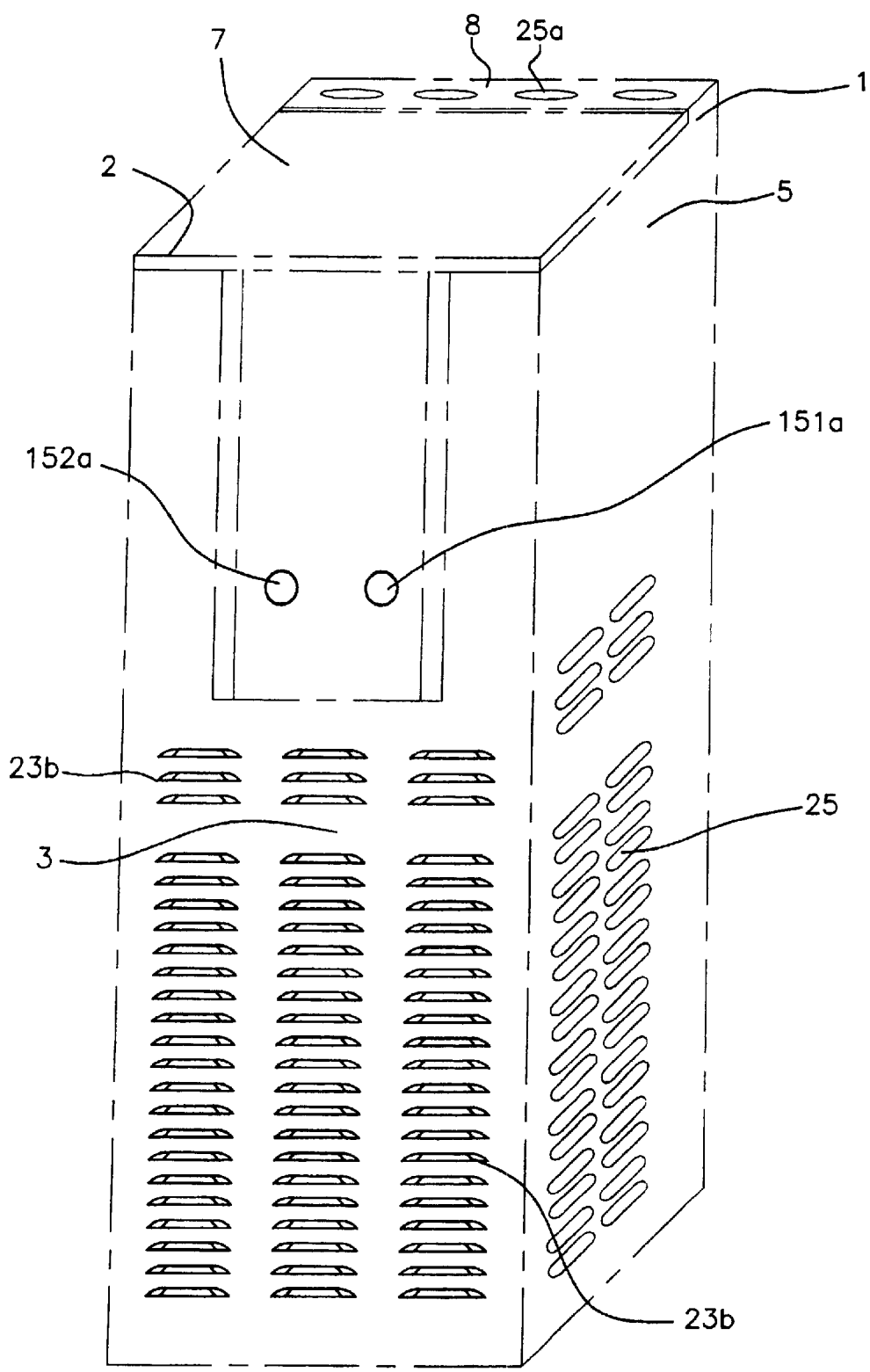
FIG. 3 is a perspective front view of the water generating machine with dispenser valves removed to show dispenser valve ports.
Figure 4:
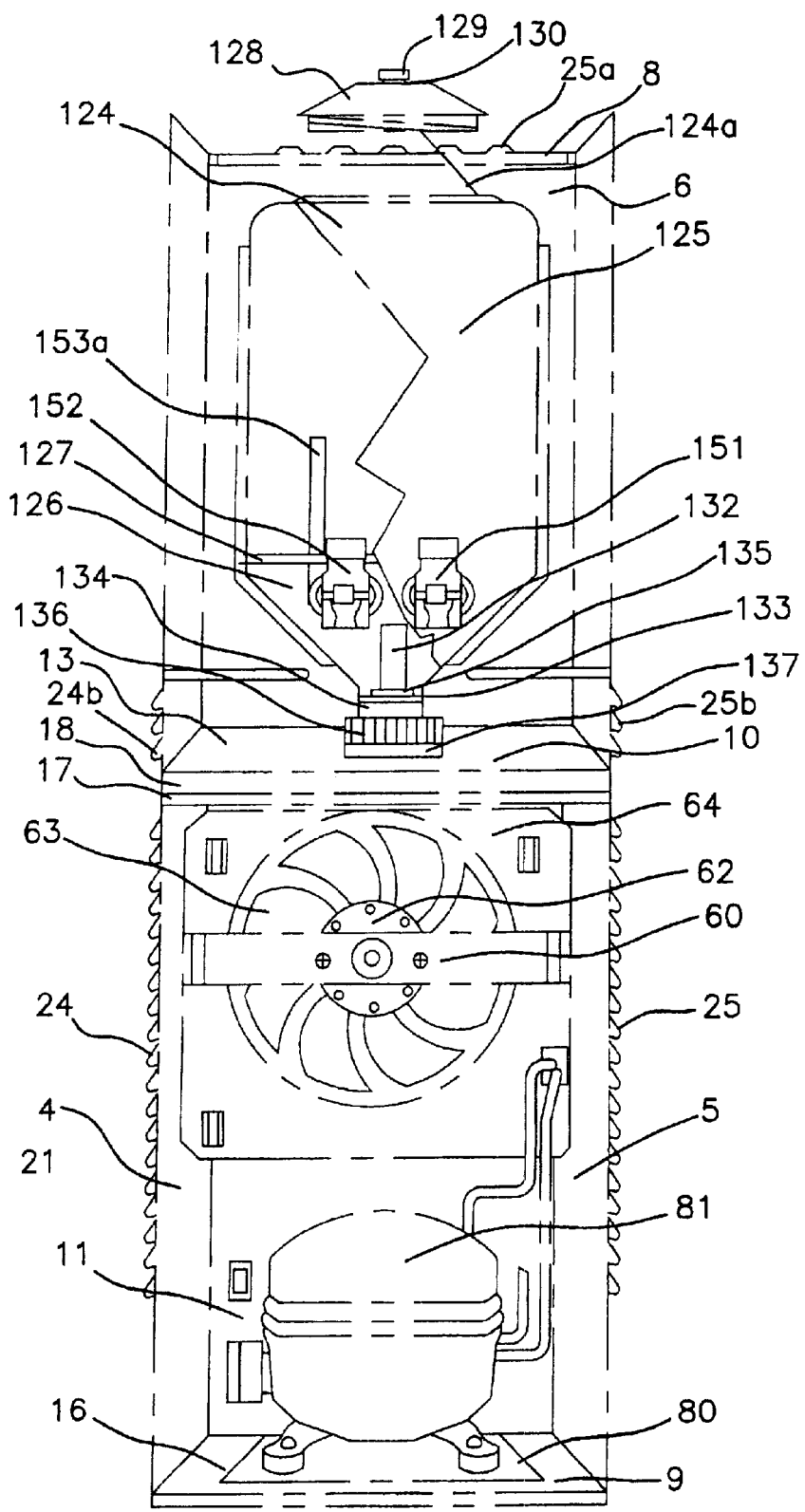
FIG. 4 is a front view of the water generating machine with the front panel and top panel removed.
Figure 5:
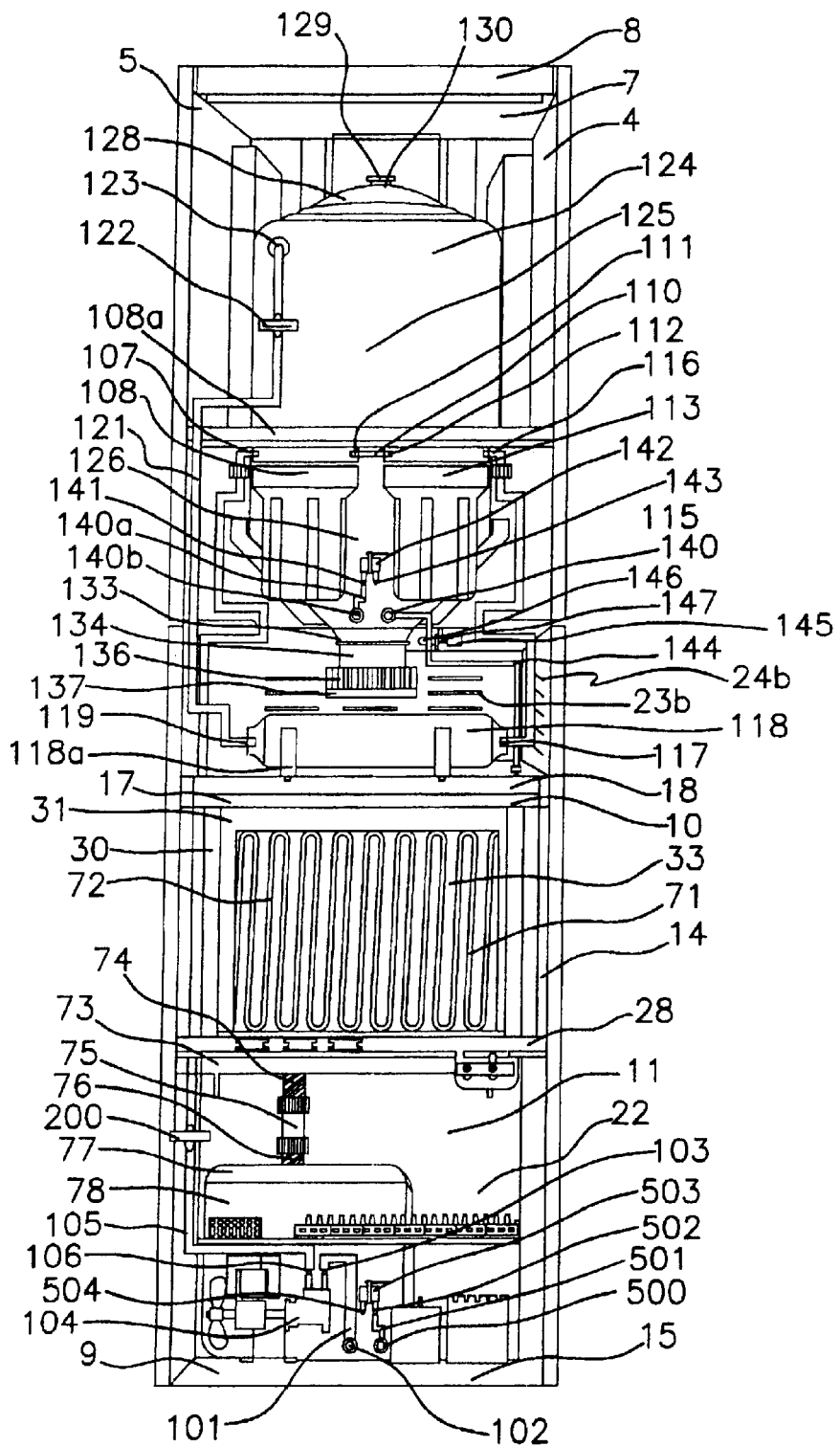
FIG. 5 is a rear view of the water generating machine with the rear panel removed.
Figure 6:
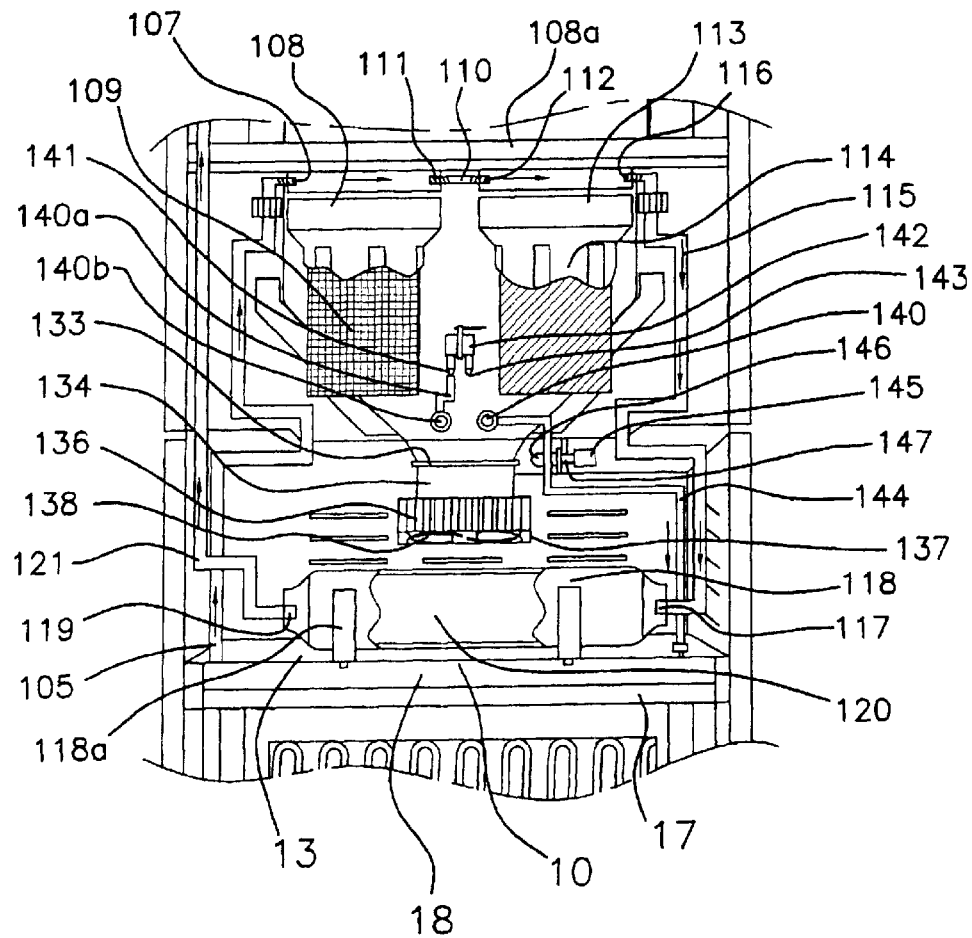
FIG. 6 is a detailed rear view of the upper chamber of the water generating machine with the rear panel removed.
Figure 7:
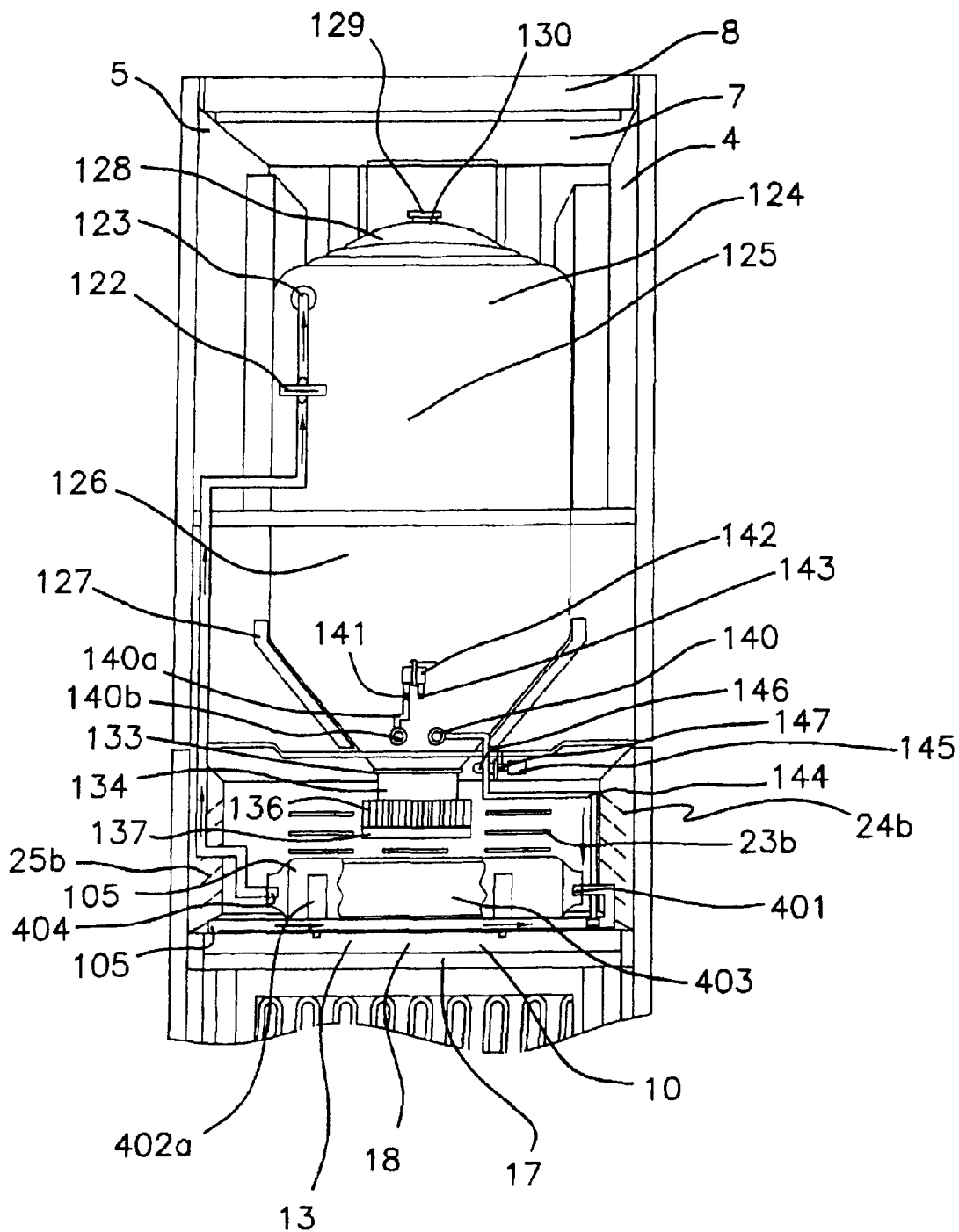
FIG. 7 is a detailed rear view of the upper chamber of the water generating machine with the rear panel removed showing the special filter.
Figure 8:
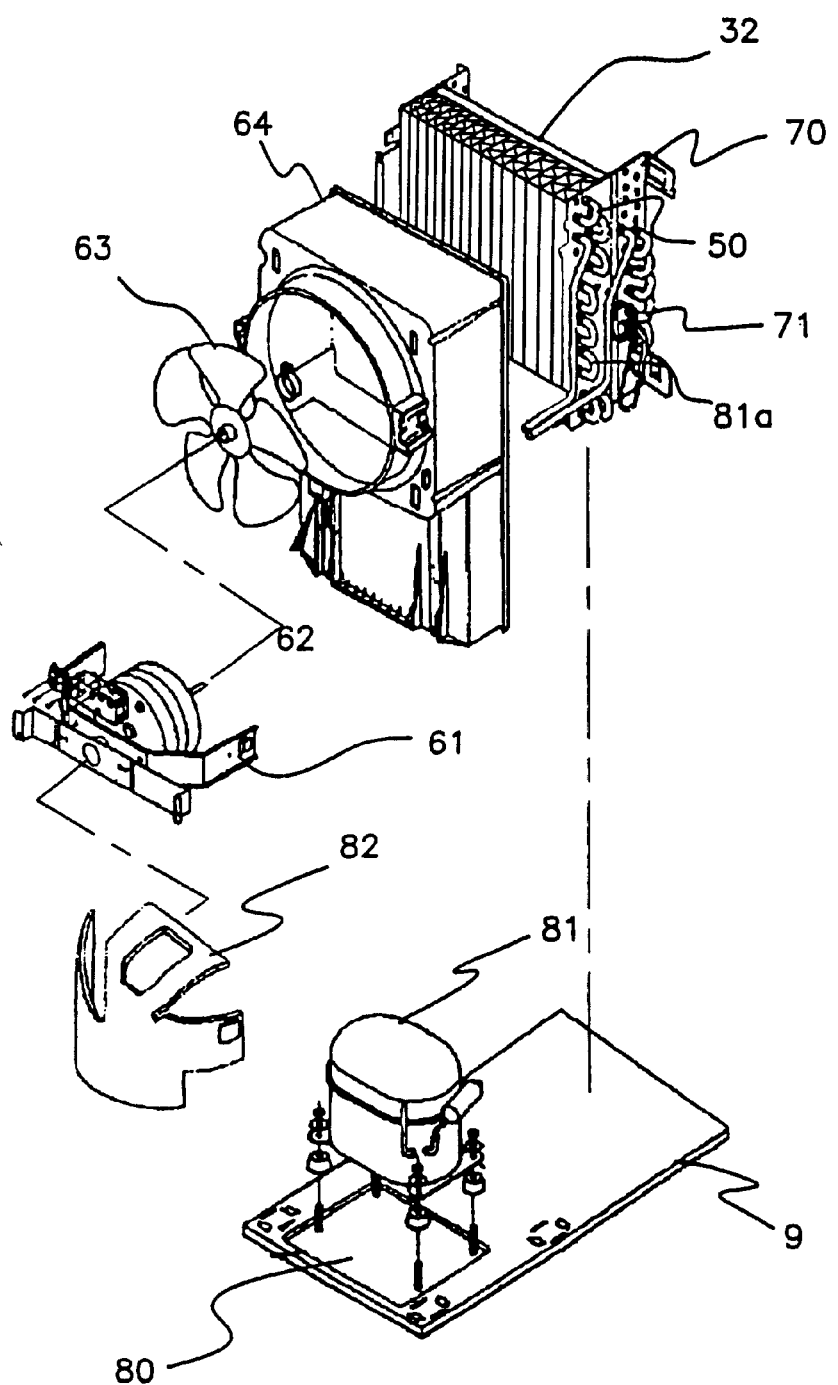
FIG. 8 is an exploded view of the fan, compressor, condenser coil, and evaporator coil assemblies.
Figure 9:
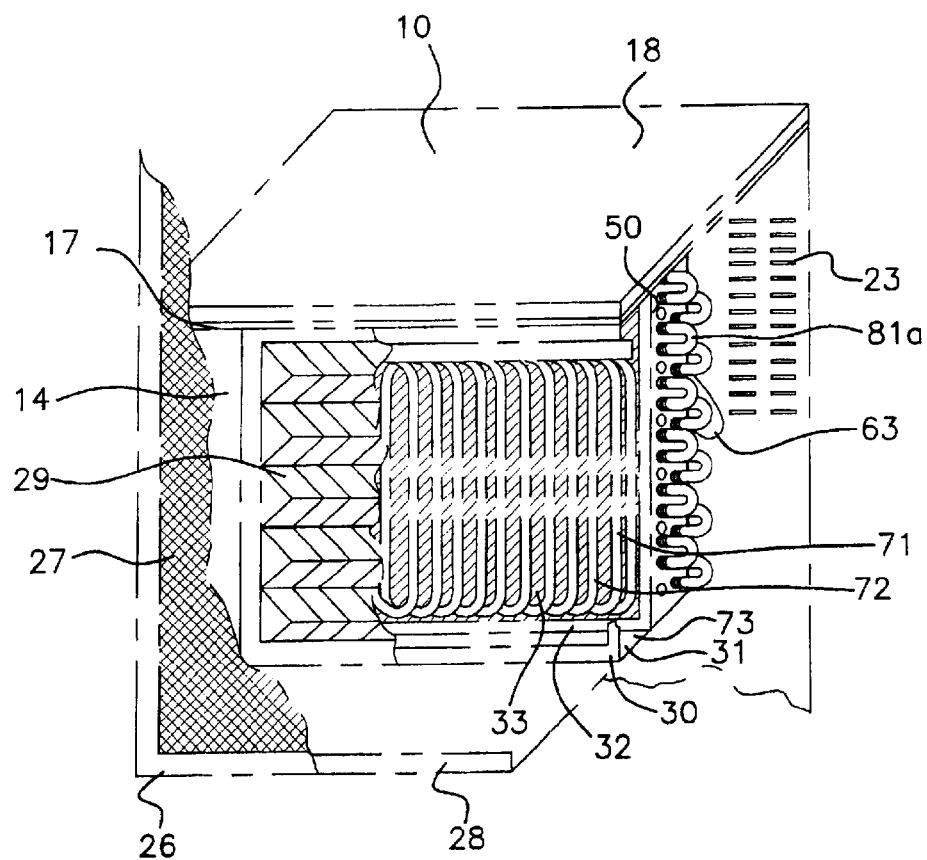
FIG. 9 is a detailed perspective view of the rear middle chamber of the water generating machine.

This invention is a water generating machine that extracts water from ambient air by providing a condensing surface at a temperature below dew point. The presence of contaminates contained in the condensed water is reduced by filtering both the ambient air and the resulting condensate and by constructing the machine from components that produce minimal particulate matter. Bacteriological contamination in the condensed water is reduced by constructing the machine from components that retard bacteria growth and by maintaining a continuous flow of condensed water throughout the device.

In particular, the present invention is a water generating machine 1 having a housing 2. Housing 2 is comprised of front panel 3, left side panel 4, right side panel 5, rear panel 6, top panel 7, top support panel 8, bottom panel 9, upper thermal shield 10, and lower thermal shield 11. In other embodiments, front panel 3, left side panel 4, right side panel 5, rear panel 6, top panel 7, top support panel 8. or bottom panel 9 may be constructed of constituent parts, which may be assembled to form a particular front panel 3, left side panel 4, right side panel 5, rear panel 6, top panel 7, top support panel 8, or bottom panel 9.

Bottom panel 9 is oriented horizontally. The forward edge of bottom panel 9 is joined to the bottom edge of vertically disposed front panel 3 with a welded or fastened joint. The left edge of bottom panel 9 is joined to the bottom edge of vertically disposed left side panel 4 with a welded or fastened joint. In one embodiment, the left edge of bottom panel 9 is joined to the bottom edge of left side panel 4 with nut and bolt assemblies, or equivalent. The right edge of bottom panel 9 is joined to the bottom edge of vertically disposed right side panel 5 with a welded or fastened joint. In one embodiment, the right edge of bottom panel 9 is joined to the bottom edge of right side panel 5 with nut and bolt assemblies, or equivalent. The rear edge of bottom panel 9 is joined to the bottom edge of vertically disposed rear panel 6 with a fastened joint. In one embodiment, the rear edge of bottom panel 9 is joined to the bottom edge of rear panel 6 with nut and bolt assemblies, or equivalent. Top panel 7 is oriented horizontally. The forward edge of top panel 7 is joined to the top edge of vertically disposed front panel 3 with a fastened joint. In one embodiment, the forward edge of top panel 7 is joined to the top edge of front panel 3 with nut and bolt assemblies, or equivalent. The left edge of top panel 7 is joined to the top edge of vertically disposed left side panel 4 with a fastened joint. In one embodiment, the left edge of top panel 7 is joined to the top edge of left side panel 4 with nut and bolt assemblies, or equivalent. The right edge of top panel 7 is joined to the top edge of vertically disposed right side panel 5 with a fastened joint. In one embodiment, the right edge of top panel 7 is joined to the top edge of right side panel 5 with nut and bolt assemblies, or equivalent. The left edge of top support panel 8 is joined to the top edge of vertically disposed left side panel 4 with a fastened joint. In one embodiment, the left edge of top support panel 8 is joined to the top edge of left side panel 4 with nut and bolt assemblies, or equivalent. The right edge of top support panel 8 is joined to the top edge of vertically disposed right side panel 5 with a fastened joint. In one embodiment, the right edge of top support panel 8 is joined to the top edge of right side panel 5 with nut and bolt assemblies, or equivalent. The rear edge of top support panel 8 is joined to the top edge of vertically disposed rear panel 6 with a fastened joint. In one embodiment, the rear edge of top support panel 8 is joined to the top edge of rear panel 6 with nut and bolt assemblies, or equivalent. The rear edge of top panel 7 is fitted to the forward edge of top support panel 8 by friction.

Upper thermal shield 10 is horizontally disposed within housing 2 and extends completely between the interior sides of front panel 3, left side panel 4, right side panel 5, and rear panel 6 in a manner that defines the lower boundary of upper chamber 13 and the upper boundaries of rear middle chamber 14 and forward chamber 16. In one embodiment, upper thermal shield 10 is joined to front panel 3, left side panel 4, and right side panel 5 with welded joints but not joined to rear panel 6. In a second embodiment, upper thermal shield 10 is joined to front panel 3, left side panel 4, and right side panel 5 with nut and bolt assemblies, or equivalent, but not joined to rear panel 6. In addition, the joints between upper thermal shield 10 and front panel 3, left side panel 4, and right side panel 5 are sealed with silicone caulk or similar material. In the embodiment where upper thermal shield 10 is joined to front panel 3, left side panel 4, and right side panel 5 with welded joints, the welded joints prevent the exchange of air between upper chamber 13 and rear middle chamber 14 and between upper chamber 13 and forward chamber 16. In the embodiment where upper thermal shield 10 is joined to front panel 3, left side panel 4, and right side panel 5 with nut and bolt assemblies, or equivalent, the seal of silicone caulk or similar material prevents the exchange of air between upper chamber 13 and rear middle chamber 14 and between upper chamber 13 and forward chamber 16. In either the embodiment with welded joints or the embodiment with nut and bolt assemblies, or equivalent, the seal of silicone caulk or similar material insulates upper chamber 13 from heat, which is typically generated by condenser coil 81A, compressor 81, and fan motor 62 located within rear middle chamber 14 and forward chamber 16 and reduces the level of noise otherwise produced by water generating machine 1. In addition, upper thermal shield 10 insulates upper chamber 13 from heat located within rear middle chamber 14 and forward chamber 16.

Upper thermal shield 10 is constructed of a first layer 17 of corrosion resistant treated metal or plastic and a second layer 18 of insulation material. In one embodiment, first layer 17 is joined to second layer 18 using a standard adhesive. In a second embodiment, first layer 17 is fitted to second layer 18 by friction. In a third embodiment, second layer 18 is disposed entirely within first layer 17 and joined using a standard adhesive or fitted by friction. In one embodiment, first layer 17 is galvanized metal. In a second embodiment, first layer 17 is stainless steel. Second layer 18 is disposed above first layer 17. In one embodiment, second layer 18 is an open celled polymer foam of relatively uniform depth having an insulation value of R5 or greater. In a second embodiment, second layer 18 is a closed celled polymer foam of relatively uniform depth having an insulation value of R5 or greater. In a third embodiment, second layer 18 is a combination open and closed celled polymer foam of relatively uniform depth having an insulation value of R5 or greater. In a fourth embodiment, second layer 18 is an open celled polymer foam of a relatively uniform depth of no more than one inch having an insulation value of R5 or greater. In a fifth embodiment, second layer 18 is a closed celled polymer foam of a relatively uniform depth of no more than one inch having an insulation value of R5 or greater. In a sixth embodiment, second layer 18 is a combination open and closed celled polymer foam of relatively uniform depth of no more than one inch having an insulation value of R5 or greater. In subsequent embodiments, second layer 18 is any insulating material having an insulation value of R5 or greater.

Lower thermal shield 11 is vertically disposed within housing 2 approximately along the vertical center line of left side panel 4 and right side panel 5 and extends between the interior sides of bottom panel 9, left side panel 4, right side panel 5, and the exterior side of the lower panel of environmental control enclosure 31 in a manner that defines the lower rear boundary of forward chamber 16 and the forward boundary of rear lower chamber 15. In one embodiment, lower thermal shield 11 is joined to bottom panel 9, left side panel 4, right side panel 5, and the exterior side of the lower panel of environmental control enclosure 31 with welded joints. In a second embodiment, lower thermal shield 11 is joined to bottom panel 9, left side panel 4, right side panel 5, and the exterior side of the lower panel of environmental control enclosure 31 with nut and bolt assemblies, or equivalent. In addition, the joints between lower thermal shield 11 and bottom panel 9, left side panel 4, right side panel 5, and the exterior side of the lower panel of environmental control enclosure 31 are sealed with silicone caulk or similar material. In the embodiment where lower thermal shield 11 is joined to bottom panel 9, left side panel 4, right side panel 5, and the exterior side of the lower panel of environmental control enclosure 31 with welded joints, the welded joints prevent the exchange of air between forward chamber 16 and rear lower chamber 15. In the embodiment where lower thermal shield 11 is joined to bottom panel 9, left side panel 4, right side panel 5, and the exterior side of the lower panel of environmental control enclosure 31 with nut and bolt assemblies, or equivalent, the seal of silicone caulk or similar material prevents the exchange of air between forward chamber 16 and rear lower chamber 15. In either the embodiment with welded joints or the embodiment with nut and bolt assemblies, or equivalent, the seal of silicone caulk or similar material insulates rear lower chamber 15 from heat predominately generated by compressor 81 and fan motor 62 located within forward chamber 16, and condenser coil 81A located within rear middle chamber 14, and reduces the level of noise otherwise produced by water generating machine 1. In addition, lower thermal shield 11 insulates rear lower chamber 15 from heat located within forward chamber 16.

Lower thermal shield 11 is constructed of a first layer 21 of corrosion resistant treated metal or plastic and a second layer 22 of insulation material. In one embodiment, first layer 21 is joined to second layer 22 using a standard adhesive. In a second embodiment, first layer 21 is fitted to second layer 22 by friction. In a third embodiment, second layer 22 is disposed entirely within first layer 21 and joined using a standard adhesive or fitted by friction. In one embodiment, first layer 21 is galvanized metal. In a second embodiment, first layer 21 is stainless steel. Second layer 22 is disposed rearward of first layer 21. In one embodiment, second layer 22 is an open celled polymer foam of relatively uniform depth having an insulation value of R5 or greater. In a second embodiment, second layer 22 is a closed celled polymer foam of relatively uniform depth having an insulation value of R5 or greater. In a third embodiment, second layer 22 is a combination open and closed celled polymer foam of relatively uniform depth having an insulation value of R5 or greater. In a fourth embodiment, second layer 22 is an open celled polymer foam of a relatively uniform depth of no more than one inch having an insulation value of R5 or greater. In a fifth embodiment, second layer 22 is a closed celled polymer foam of a relatively uniform depth of no more than one inch having an insulation value of R5 or greater. In a sixth embodiment, second layer 22 is a combination open and closed celled polymer foam of relatively uniform depth of no more than one inch having an insulation value of R5 or greater. In subsequent embodiments, second layer 22 is any insulating material having an insulation value of R5 or greater.

The forward exterior side of the lower panel of environmental control enclosure 31 is in communication with the upper edge of the first layer 21 of lower thermal shield 11 and joined with a welded joint, which prevents the exchange of air between forward chamber 16 and rear lower chamber 15.

Front panel 3 has vents 23 and vents 23B. Left side panel 4 has vents 24 and vents 24B. Right side panel 5 has vents 25 and vents 25B. Top support panel 8 has vents 25A. Vents 23, 24, and 25 allow air to flow between the interior space of forward chamber 16 and the exterior of housing 2. Vents 23B, 24B, and 25B allow air to flow between the interior space of upper chamber 13 and the exterior of housing 2. In one embodiment, vents 23, 23B, 24, 24B, 25, and 25B are louvered, which directs flowing air away from housing 2, which forms a column of rising air distant from housing 2 and reduces the amount of flowing air that recirculates back into housing 2. In one embodiment, the collective area of vents 24 and 25 is equal to the collective area of vents 23. In another embodiment, the collective area of vents 24 and 25 is greater than the collective area of vents 23.

Compressor base plate 80 is contained within the interior space of forward chamber 16 in communication with bottom panel 9. In one embodiment, compressor base plate 80 is secured to bottom panel 9 with nut and bolt assemblies, or equivalent. In a second embodiment, compressor base plate 80 is secured to tabs formed from bottom panel 9 using retaining pins. Compressor 81 is contained within the interior space of forward chamber 16 in communication with compressor base plate 80. In one embodiment, compressor 81 is secured to bottom panel 9 omitting compressor base plate 80. Compressor 81 is sized in order to extract water from ambient air having a temperature of between 50° C. and 400° C. and a relative humidity of at least 25%. In one embodiment, compressor 81 is controlled by electric timer 81B, which sets the number of minutes compressor 81 is on and the number of minutes compressor 81 is off. Any number between and including 1 and 100 may be selected for the number of minutes compressor 81 is on. In addition, any number between and including 1 and 100 may be selected for the number of minutes compressor 81 is off. For example, if 5 is selected for the time compressor 81 is on and 10 is selected for the time compressor 81 is off, compressor 81 will operate continuously for 5 minutes and then wait for 10 minutes for an overall duty cycle of 15 minutes. In one embodiment, compressor 81 is model D40L available from Oasis, or equivalent. In another embodiment, compressor 81 is model 5840 available from Sears, or equivalent. Compressor 81 is secured to compressor base plate 80 with nut and bolt assemblies, or equivalent. In one embodiment, the washers comprising one aspect of the nut and bolt assemblies, or equivalent, are plastic. Compressor cover 82 is contained within the interior space of forward chamber 16 in communication with compressor 81. In one embodiment, compressor cover 82 is constructed of fiberglass insulation wrapped in thermal resistant plastic. In one embodiment, compressor cover 82 is secured to compressor 81 with hook and loop fasteners. In a second embodiment, compressor cover 82 is secured to compressor 81 with snaps. In a third embodiment, compressor cover 82 is secured to compressor 81 with plastic ties. In subsequent embodiments, compressor cover 82 is secured to compressor 81 with any fastener suitable for fastening fabric to metal. The placement of compressor 81 exterior to environmental control enclosure 31 reduces the amount of particulate matter that contacts condensation surface 72 ultimately collecting in the liquid water or ice condensate.

Power cord 250 is in communication with power cord port 251 of housing 2 and routed to rear lower chamber 15. In one embodiment, utility enclosure 181 incorporates a ground fault interrupt device in the event electrical flow is disrupted, which may occur by coming in contact with water.

Air inlet port 26 is defined by an opening in rear panel 6, which provides fluid communication between the exterior of housing 2 and the interior space of upper chamber 13 and rear middle chamber 14. The opening in rear panel 6 is sufficiently large to allow access to charcoal filter housing 108, sediment filter housing 113, and sanitization light housing 118. Primary air filter bracket 28 is in communication with the perimeter of the opening in rear panel 6. In one embodiment, primary air filter bracket 28 is welded to the perimeter of the opening in rear panel 6. Primary air filter 27 is in communication with primary air filter bracket 28. In one embodiment, primary air filter 27 is secured to primary air filter bracket 28 by friction. Primary air filter 27 may be removed from primary air filter bracket 28 for inspection, cleaning, or replacement. Primary air filter 27 is mounted so that all flowing air passing through air inlet port 26 also passes through a first, then second face of primary air filter 27. Primary air filter 27 removes particulates such as lint, dust, insects, pollen, and dander from the flowing air passing through primary air filter 27. In one embodiment, primary air filter 27 removes approximately 90% of the particulate matter having a size equal to or larger than 1 micron from the flowing air passing through primary air filter 27. In another embodiment, primary air filter 27 is a high efficiency air filter capable of removing 90% of the particulate matter having a size equal to or larger than 1 micron from the flowing air passing through primary air filter 27. In another embodiment, primary air filter 27 is a commercially available filter from Web Products having Model Number 14x25. Primary air filter 27 reduces the amount of particulate matter that contacts condensation surface 72 by collecting a portion of the particulate matter contained in the flowing air passing through primary air filter 27.

A first face of secondary air filter 29 is adjacent to and disposed in an approximately parallel plane to a second face of primary air filter 27. Secondary air filter 29 fits within the annular space of the inlet opening of environmental control enclosure 31. The perimeter of a second face of secondary air filter 29 is in communication with a first face of filter frame stop 30, which is in communication with the interior sides of the panels that comprise environmental control enclosure 1. In one embodiment, filter frame stop 30 is joined to environmental control enclosure 31 with welded joints. The perimeter of secondary air filter 29 and an interior portion of environmental control enclosure 31 is friction fit and sealed with foam stripping. In one embodiment, the foam stripping is white closed cell water resistant vinyl foam model #101 distributed by W. J. Dennis Company, or equivalent. Secondary air filter 29 may he removed from environmental control enclosure 31 for inspection, cleaning, or replacement. Secondary air filter 29 removes particulates such as lint, dust, insects, pollen, and dander from the flowing air passing through secondary air filter 29. In one embodiment, secondary air filter 29 removes approximately 90% of the particulate matter equal to or larger than I micron from the flowing air passing through secondary air filter 29. In a second embodiment, secondary air filter 29 is a high efficiency pleated filter capable of removing 98% of the particulate matter having a size equal to or larger than one micron from the flowing air passing through secondary air filter 29. In another embodiment, secondary air filter 29 is filter Model No. 0104 manufactured by 3M Company.

Environmental control enclosure 31 is disposed within rear middle chamber 14 and has four panels in the form of a rectangular box having opposite ends that are open. In one embodiment, environmental control chamber 31 is secured to the panels of rear middle chamber 14 with welded joints. Environmental control enclosure 31 is formed from materials that produce little or no particulate matter. In one embodiment, environmental control enclosure 31 is formed from corrosion resistant treated metal. In a second embodiment, environmental control enclosure 31 is formed from stainless steel. In third embodiment, environmental control enclosure 31 is formed from plastic.

A first face of exit filter frame 32 is in communication with the perimeter of the outlet opening of environmental control enclosure 31. In one embodiment, exit filter frame 32 is joined to the outlet opening of environmental control enclosure 31 by friction. Exit filter frame 32 is constructed of aluminum, plastic, cardboard, or other suitable material. Exit air filter 33 fits within exit filter frame 32. In one embodiment, exit air filter 33 is secured within exit filter frame 32 by friction. Air gaps between exit air filter 33 and exit filter frame 32 are sealed with fiberglass tape Model No. 8959 manufactured by 3M Company, or equivalent. Exit filter frame 32 is mounted so that all flowing air passing through environmental control enclosure 31 in a direction away from air inlet port 26 passes through exit air filter 33. Exit air filter 33 removes particulates such as lint, dust, insects, pollen, and dander from the flowing air passing through exit air filter 33. In one embodiment, exit air filter 33 removes approximately 98% of particulate matter having a size equal to or larger than 1 micron from the flowing air passing through exit air filter 33. In another embodiment, exit air filter 33 is constructed using Filtrete® or comparable material as the air filtration constituent. At certain times, air within environmental control enclosure 31 flows in a direction other than from air inlet port 26 to the outlet opening of environmental control enclosure 31. This reverse air flow may exist when rear panel 6 or primary air filter 27 are not in place or when fan 63 is either not rotating or rotating in a manner that creates small variable direction air currents. Exit air filter 33 reduces the amount of particulate matter contained in air flowing in a direction from the outlet opening of environmental control enclosure 31 toward air inlet port 26 by trapping such particulate matter, which, in turn, reduces the amount of particulate matter that contacts condensation surface 72.

A first portion of condenser coil frame 50 is in communication with the perimeter of the outlet opening of exit filter frame 32. In one embodiment, condenser coil frame 50 is joined to the outlet opening of exit filter frame 32 by friction. Condenser coil frame 50 is constructed of galvanized corrosion resistant metal, stainless steel, or other suitable material. Condenser coil 81A fits within condenser coil frame 50. In one embodiment, condenser coil 81A is secured within condenser coil frame 32 by soldered joints. A first portion of condenser coil 81 A is routed first through the outlet opening of environmental control enclosure 31 and then through a sealed port in fan housing 64 whereby a first end of condenser coil 81 A terminates at compressor 81. A second end of condenser coil 81A terminates at a second end of evaporation coil 71. First and second ends of condenser coil 81A are joined to compressor 81 and evaporation coil 71 with solder joints. Condenser coil frame 50 is mounted so that all flowing air passing through exit filter frame 32 in a direction away from air inlet port 26 passes over condenser coil 81A. Exit air filter 33 removes particulates such as lint, dust, insects, pollen, and dander from the flowing air passing through exit air filter 33. In one embodiment, exit air filter 33 removes approximately 98% of particulate matter having a size equal to or larger than 1 micron from the flowing air passing through exit air filter 33.

Fan housing 64 is secured to the perimeter of the outlet air opening of condenser coil frame 50 with nut and bolt assemblies, or equivalent. A first end of fan motor bracket 61 is in communication with the outlet air opening of fan housing 64 and secured with nut and bolt assemblies, or equivalent. A second end of fan motor bracket 61 is in communication with the outlet air opening of fan housing 64 and secured with nut and bolt assemblies, or equivalent. Fan motor 62 is removably secured to fan motor bracket 61. Fan 63 is attached to the fan motor shaft of fan motor 62. In one embodiment, fan housing 64 is fitted with a cowling, which directs the flow of air away from environmental control enclosure 31.

One portion of coil mounting bar 70 is in communication with an interior panel of environmental control enclosure 31. A second portion of coil mounting bar 70 is in communication with evaporation coil 71 having condensation surface 72. Evaporation coil 71 is disposed within the interior space of environmental control enclosure 31. Evaporation coil 71 snap fits to coil mounting bar 70 and held in place by friction. Evaporation coil 71 is constructed of aluminum, stainless steel, or other suitable material and may be coated or anodized. In one embodiment, evaporation coil 71 is coated with food grade epoxy coating B62W201 with epoxy hardener B60V20, distributed by Sherwin Williams. The presence of a coating or anodized surface on evaporation coil 71 reduces the amount of ionic or particulate matter transferred from evaporation coil 71 to water condensing on condensation surface 72. A first portion of evaporation coil 71 is routed first through the outlet opening of environmental control enclosure 31 and then through a sealed port in fan housing 64 whereby a first end of evaporation coil 71 terminates at compressor 81. A second end of evaporation coil 71 terminates at a second end of condenser coil 81 A. First and second ends of evaporation coil 71 are joined to compressor 81 and condenser coil 81 A with solder joints. Collector tray 73 is disposed within environmental control enclosure 31 and in communication with the bottom panel of environmental control enclosure 31. Collector tray 73 is fitted with drain port 74, which extends through a third port on the bottom panel of environmental control enclosure 31. In one embodiment, drain port 74 has a circular shape. In another embodiment, drain port 74 has a rectangular shape. In one embodiment, the bottom panel of environmental control enclosure serves the function of collector tray 73. In one embodiment, collector tray 73 is constructed of rigid plastic. In a second embodiment, collector tray 73 is constructed of stainless steel. In other embodiments, collector tray 73 is constructed of material suitable for contact with potable water. In one embodiment, collector tray 73 has a shape in which all four corners of collector tray 73 are at an elevation higher than drain port 74, which promotes water flow to drain port 74 and prevents water from pooling in collector tray 73.

A first end of drain port connection tube 75 is in communication with a first end of drain port 74. Drain port connection tube 75 is constructed of material suitable for use with potable water. In one embodiment, drain port connection tube 75 is constructed of Tygon® tubing. In a second embodiment, drain port connection tube 75 is constructed of Tygon® tubing having a grade of "high purity." In a third embodiment, drain port connection tube 75 is constructed of plastic or PVC tubing. In a fourth embodiment, drain port connection tube 75 is constructed of stainless steel tubing. In one embodiment, drain port connection tube 75 is joined to a first end of drain port 74 with a standard compression fitting. A second end of drain port connection tube 75 is in communication with pump tank inlet port 76 of pump tank 77. In one embodiment, second end of drain port connection tube 75 is joined to pump tank inlet port 76 of pump tank 77 with a standard compression fitting. In a second embodiment, second end of drain port connection tube 75 is joined to pump tank inlet port 76 of pump tank 77 with a standard barbed fitting. Pump tank 77 is constructed of material suitable for use with potable water. In one embodiment, pump tank 77 is constructed of stainless steel. In a second embodiment, pump tank 77 is constructed of Nalgen® plastic. In a third embodiment, pump tank 77 is constructed of polypropylene. The interior volume of pump tank 77 is no greater than approximately two quarts, which limits the amount of time water resides in pump tank 77. In one embodiment, pump tank 77 is in communication with insulating jacket 78, which reduces the amount of heat transferred to water contained in pump tank 77. In one embodiment, the material used to construct pump tank 77 is impregnated with a silver ion antibacterial material, which reduces the number of living bacteria in water passing through pump tank 77. In a second embodiment, the material used to construct pump tank 77 is impregnated with a silver ion antibacterial material distributed by Healthshield.

In one embodiment, float switch 300 is disposed within the interior space of pump tank 77. The water level within pump tank 77 is measured according to the position of float 301, which floats on the surface of water contained within pump tank 77. In one embodiment, float 301 is constructed of stainless steel. In another embodiment, float 301 is constructed of PVC plastic. In one embodiment, sensor 302 identifies float 301 and sends a signal when float 301 is at one of three different positions within pump tank 77. If float 301 is at a middle position within pump tank 77, sensor 302 sends a signal to activate pump 104. If float 301 is at a lower position within pump tank 77, sensor 302 sends a signal to turn off pump 104. If float 301 is at an upper position within pump tank 77, sensor 302 sends a signal to turn off power to water generating machine 1. During normal operation, the water level within pump tank 77 varies between the middle position and the lower position. Float switch 300 activates pump 104 when the water level within pump tank 77 reaches the middle position, which nearly empties pump tank 77. Float switch 300 deactivates pump 104 when the water level within pump tank 77 reaches the lower position, which prevents pump 104 from operating when pump tank 77 is nearly empty.

In a second embodiment, a pressure transducer may be used to measure the amount of water in pump tank 77 and in turn, activate and deactivate pump 104. A first end of pump tank pressure tube 501 is in communication with the perimeter of pump tank port 500. In one embodiment, first end of pump tank pressure tube 501 is joined to pump tank port 500 with a standard male pipe adapter compression fitting. In a second embodiment, first end of pump tank pressure tube 501 is joined to pump tank port 500 with a barbed fitting. In a third embodiment, first end of pump tank pressure tube 501 is joined to pump tank port 500 with a barbed fitting having a snap retainer ring attached to pump tank pressure tube 501. A second end of pump tank pressure tube 501 is in communication with pressure transducer inlet 502 of pressure transducer 503. In one embodiment, second end of pump tank pressure tube 501 is joined to pressure transducer inlet 502 of pressure transducer 503 with a standard male pipe adapter compression fitting. In a second embodiment, second end of pump tank pressure tube 501 is joined to pressure transducer inlet 502 of pressure transducer 503 with a standard barbed fitting. Pressure transducer outlet 504 of pressure transducer 503 is in fluid communication with the atmosphere and is a pressure reference point for pressure transducer inlet 502.

A first end of pump tank outlet tube 101 is in communication with the perimeter of pump tank outlet port 102 of pump tank 77. Pump tank outlet tube 101 is constructed of material suitable for use with potable water. In one embodiment, pump tank outlet tube 101 is constructed of Tygon® tubing. In a second embodiment, pump tank outlet tube 101 is constructed of Tygon® tubing having a grade of "high purity." In a third embodiment, pump tank outlet tube 101 is constructed of plastic tubing. In a fourth embodiment, pump tank outlet tube 101 is constructed of stainless steel tubing. In one embodiment, pump tank outlet tube 101 is secured to pump tank outlet port 102 with a threaded circular fitting having an annular space to accommodate flowing water.

A second end of pump tank outlet tube 101 is in communication with pump inlet 103 of pump 104. In one embodiment, second end of pump tank outlet tube 101 is joined to pump inlet 103 of pump 104 with a standard barbed fitting. In one embodiment, pump 104 is removably secured to housing 2 with nut and bolt assemblies, or equivalent. In one embodiment, pump 104 is a sealed pump designed to limit the amount of contaminates introduced by the pump into the water circulating within the pump. In a second embodiment, pump 104 is a medical grade pump. In a third embodiment, pump 104 is an external non-enclosed medical grade mini-gear pump capable of producing 10 psi pressure and a water flow rate of 0.5 gallons per minute. In a fourth embodiment, pump 104 is an external non-enclosed medical grade mini-gear pump distributed by Cole Parmer. A first end of pump outlet tube 105 is in communication with the perimeter of pump outlet 106 of pump 104. Pump outlet tube 105 is constructed of material suitable for use with potable water. In one embodiment, pump outlet tube 105 is constructed of Tygon® tubing. In a second embodiment, pump outlet tube 105 is constructed of Tygon® tubing having a grade of "high purity." In a third embodiment, pump outlet tube 105 is constructed of plastic tubing. In a fourth embodiment, pump outlet tube 105 is constructed of stainless steel tubing.

Lower check valve 200 is disposed in an in-line arrangement within pump outlet tube 105. In a preferred embodiment, lower check valve 200 is positioned nearer to the first end of pump outlet tube 105 as compared with the second end of pump outlet tube 105. In a preferred embodiment, lower check valve 200 is an in-line one-way lowpressure check valve containing a single gravity operated disc constructed of plastic. The disc, combined with the backpressure of water upstream of lower check valve 200, prevents water from flowing into pump 104 through pump outlet tube 105.

Pump outlet tube 105 is routed through sealed openings in environmental control enclosure 31. A second end of pump outlet tube 105 is in communication with the perimeter of charcoal filter housing inlet 107 of charcoal filter housing 108. In one embodiment, second end of pump outlet tube 105 is joined to charcoal filter housing inlet 107 with a standard compression fitting. In a second embodiment, second end of pump outlet tube 105 is joined to charcoal filter housing inlet 107 with a standard barbed fitting, or other fitting suitable for handling potable water. In one embodiment, charcoal filter housing 108 is disposed within upper chamber 13 to allow easy access to charcoal filter housing 108 through the opening in rear panel 6. Charcoal filter housing 108 is in communication with filter housing bracket 108A and secured with screws or similar fasteners. Filter housing bracket 108A is in communication with housing 2 and secured with a welded joint or screws or similar fasteners. In one embodiment, charcoal filter housing 108 is constructed of plastic. Disposed within the interior space of charcoal filter housing 108 is charcoal filter 109. In one embodiment, charcoal filter 109 is a Matrikx filter model PB1 manufactured by KX Industries. A first end of charcoal filter outlet tube 110 is in communication with the perimeter of charcoal filter housing outlet 111 of charcoal filter housing 108. Charcoal filter outlet tube 110 is constructed of material suitable for use with potable water. In one embodiment, charcoal filter outlet tube 110 is constructed of Tygon® tubing. In a second embodiment, charcoal filter outlet tube 110 is constructed of Tygon® tubing having a grade of "high purity." In a third embodiment, charcoal filter outlet tube 110 is constructed of stainless steel. In a fourth embodiment, charcoal filter outlet tube 110 is constructed of copper. In one embodiment, charcoal filter outlet tube 110 is secured to charcoal filter housing outlet 111 with a threaded circular fitting having an annular space to accommodate flowing water. In a second embodiment, charcoal filter outlet tube 110 is secured to charcoal filter housing outlet 111 with a threaded stainless steel fitting having an annular space to accommodate flowing water. In a third embodiment, charcoal filter outlet tube 110 is secured to charcoal filter housing outlet 111 with a threaded copper fitting having an annular space to accommodate flowing water.

A second end of charcoal filter outlet tube 110 is in communication with the perimeter of sediment filter housing inlet 112 of sediment filter housing 113. In one embodiment, sediment filter housing 113 is disposed within upper chamber 13 to allow easy access to sediment filter housing 113 through the opening in rear panel 6. Sediment filter housing 113 is in communication with filter housing bracket 108A and secured with screws or similar fasteners. Filter housing bracket 108A is in communication with housing 2 and secured with a welded joint screws or similar fasteners. In one embodiment, sediment filter housing 113 is constructed of molded plastic. Disposed within the interior space of sediment filter housing 113 is sediment filter 114. In one embodiment, sediment filter 114 comprises thermally bonded micro fibers or similar material. A first end of sediment filter outlet tube 115 is in communication with the perimeter of sediment filter housing outlet 116 of sediment filter housing 113. Sediment filter outlet tube 115 is constructed of material suitable for use with potable water. In one embodiment, sediment filter outlet tube 115 is constructed of Tygon® tubing. In a second embodiment, sediment filter outlet tube 115 is constructed of Tygon® tubing having a grade of "high purity." In a third embodiment, sediment filter outlet tube 115 is constructed of plastic tubing. In a fourth embodiment, sediment filter outlet tube 115 is constructed of stainless steel tubing. In one embodiment, sediment filter outlet tube 115 is secured to sediment filter housing outlet 116 with a threaded circular fitting having an annular space to accommodate flowing water.

A second end of sediment filter outlet tube 115 is in communication with the perimeter of sanitization light housing inlet 117 of sanitization light housing 118. In one embodiment, sediment filter outlet tube 115 is secured to sanitization light housing inlet 117 with a threaded circular fitting having an annular space to accommodate flowing water. In a second embodiment, sediment filter outlet tube 115 is secured to sanitization light housing inlet tube with a quick disconnect fitting. In one embodiment, sanitization light housing 118 is constructed of plastic. In one embodiment, sanitization light housing 118 is disposed within upper chamber 13 to allow easy access to sanitization light housing 118 through the opening in rear panel 6. Sanitization light housing 118 is in communication with sanitization light housing slip sleeve 118A and secured by friction. Sanitization light housing slip sleeve 118A is in communication with housing 2 and secured with screws or similar fasteners. Disposed within the interior space of sanitization light housing 118 is sanitization light 120. In one embodiment, sanitization light 120 radiates light having a wavelength between 245 and 1845 nm. In another embodiment, sanitization light 120 is model UV-4 manufactured by HydroFlow. A first end of sanitization light outlet tube 121 is in communication with the perimeter of sanitization light housing outlet 119. Sanitization light outlet tube 121 is constructed of material suitable for use with potable water. In one embodiment, sanitization light outlet tube 121 is constructed of Tygon® tubing. In a second embodiment, sanitization light outlet tube 121 is constructed of Tygon® tubing having a grade of "high purity." In a third embodiment, sanitization outlet tube 121 is constructed of plastic tubing. In a fourth embodiment, sanitization outlet tube 121 is constructed of stainless steel tubing. In one embodiment, sanitization light outlet tube 121 is secured to sanitization light housing outlet 119 with a threaded circular fitting having an annular space to accommodate flowing water. In a second embodiment, sanitization light outlet tube 121 is secured to sanitization light housing outlet 119 with a quick disconnect fitting.

In one embodiment, special filter 403 replaces charcoal filter 109, sediment filter 114, sanitization light 120 and related components. In this embodiment, a second end of pump outlet tube 105 is in communication with the perimeter of special filter housing inlet 401 of special filter housing 402. In one embodiment, a second end of pump outlet tube 105 is secured to special filter housing inlet 401 with a threaded circular fitting having an annular space to accommodate flowing water. In a second embodiment, a second end of pump outlet tube 105 is secured to special filter housing inlet 401 with a quick disconnect fitting.

In one embodiment, special filter housing 402 is disposed within upper chamber 13 to allow easy access to special filter housing 402 through the opening in rear panel 6. Special filter housing 402 is in communication with special filter housing bracket 402A and secured by friction. Special filter housing bracket 402A is in communication with housing 2 and secured with screws or similar fasteners. Disposed within the interior space of special filter housing 402 is special filter 403. In one embodiment, special filter 403 is an In-Line Filter manufactured by Safari Water Filtration Systems, Inc. A first end of special filter outlet tube 121A is in communication with the perimeter of special filter housing outlet 404. In one embodiment, special filter outlet tube 121A is secured to special filter housing outlet 404 with a threaded circular fitting having an annular space to accommodate flowing water. In a second embodiment, special filter outlet tube 121A is secured to special filter housing outlet 404 with a quick disconnect fitting. In this configuration, special filter outlet tube 121A serves the same purpose as sanitization light outlet tube 121.

Upper check valve 122 is disposed in an in-line arrangement within sanitization light outlet tube 121. In a preferred embodiment, upper check valve 122 is an in-line one-way low-pressure check valve containing a single gravity operated disc constructed of plastic. The disc, combined with the backpressure of water upstream of upper check valve 122, prevents water from flowing into sanitization light 120 through sanitization light outlet tube 121 or into special filter 403 depending upon the chosen embodiment.

A second end of sanitization light outlet tube 121 is in communication with the perimeter of water storage tank inlet 123 of water storage tank 124 having a capacity of between 3.5 and 5 gallons. In one embodiment, water storage tank 124 is constructed of plastic or other material suitable for potable water. In a second embodiment, water storage tank 124 is constructed of Nalgene® plastic. In a third embodiment, water storage tank 124 is constructed of polypropylene. In one embodiment, insulating material is in communication with the exterior surface of water storage tank 124, which reduces heat transfer to any water present in water storage tank 124. In one embodiment, insulating material is fitted to the exterior of water storage tank 124 at and below the elevation of water storage tank partition 127. In one embodiment, water storage tank 124 is separated into an upper portion 125 and lower portion 126 by water storage tank partition 127, which maintains a separation between chilled and ambient water within water storage tank 124. The perimeter of water storage tank partition 127 is in communication with the interior sides of water storage tank 124, which is fitted with snap connectors to secure water storage tank partition 127. In one embodiment, water storage tank 124 is impregnated with a silver ion material, which eliminates bacteria. In a second embodiment, water storage tank 124 is impregnated with a silver ion material distributed by Healthshield.

Water storage tank lid 128 is removably secured to water storage tank 21. In one embodiment, water storage tank 124 is threaded whereby water storage tank lid 128 has receiving threads that allow water storage tank lid 128 to be secured to water storage tank 124. In one embodiment, one end of strap 124A is secured to water storage tank 124 and a second end of strap 124A is secured to water storage tank lid 128. In this configuration, strap 124A prevents water storage tank lid from being misplaced. Water storage tank lid 128 incorporates pressure relief port 129, which maintains equal air pressure between any air within water storage tank 124 and the atmosphere exterior to housing 2. Maintaining this equal pressure allows water to flow freely as it exits water storage tank 124. Pressure relief port air filter 130 is disposed within the annular space of pressure relief port 129 and maintained in communication with water storage tank lid 128. In one embodiment, pressure relief port air filter 130 is joined to water storage tank lid 128 with a standard barbed fitting. In one embodiment, relief port air filter 130 is capable of removing at least ninety-eight percent (98%) of the particulate matter having a size equal to or larger than 1 micron.

In one embodiment, float switch 131 is disposed within the interior space of water storage tank 124. The water level within water storage tank 124 is measured according to the position of float 131A, which floats on the surface of water contained within water storage tank 124. In one embodiment, float 131A is constructed of stainless steel. In another embodiment, float 131A is constructed of PVC plastic. In one embodiment, sensor 131B identifies float 131A and sends a signal when float 131A is at one of two different positions within water storage tank 124. If float 131A is at an upper position within water storage tank 124, sensor 131B sends a signal to turn off water generating machine 1. If float 131A is at a lower position within water storage tank 124, sensor 131B sends a signal to turn on water generating machine 1.

In a second embodiment, a pressure transducer may be used to measure the amount of water in water storage tank 124, which activates and deactivates water generating machine 1. A first end of water storage pressure tube 140A is in communication with the perimeter of water storage tank port 140B. In one embodiment, first end of water storage pressure tube 140A is joined to water storage tank port 140B with a standard male pipe adapter compression fitting. In a second embodiment, first end of water storage pressure tube 140A is joined to water storage tank port 140B with a barbed fitting. In a third embodiment, first end of water storage pressure tube 140A is joined to water storage tank port 140B with a barbed fitting having a snap retainer ring attached to water storage pressure tube 140A. A second end of water storage pressure tube 140A is in communication with pressure transducer inlet 141 of pressure transducer 142. In one embodiment, second end of water storage pressure tube 140A is joined to pressure transducer inlet 141 of pressure transducer 142 with a standard male pipe adapter compression fitting. In a second embodiment, second end of water storage pressure tube 140A is joined to pressure transducer inlet 141 of pressure transducer 142 with a standard barbed fitting. Pressure transducer outlet 143 of pressure transducer 142 is in fluid communication with the atmosphere and is a pressure reference point for pressure transducer inlet 141.

In one embodiment, chiller probe 132 is disposed within the annular space of chiller probe port 133 located at the lower portion of water storage tank 124. Water retention flange 134 is in communication with chiller probe 132 and the perimeter of chiller probe port 133, which maintains a watertight seal. Retainer 135 is removably attached to chiller probe 132 and in communication with the interior surface area of water storage tank 124 proximate to chiller probe port 133. Retainer 135 is joined to water storage tank 124 by friction, which maintains chiller probe 132 in a fixed position. In one embodiment, retainer 135 is threaded to chiller probe 132. The end of chiller probe 132 exterior to water storage tank 124 is in communication with heat dissipater 136, which conducts heat away from chiller probe 132. Box fan housing 137 is in communication with heat dissipater 136 and provides a location for mounting box fan 138. Box fan 138 circulates air in upper chamber 13 where it exhausts through vents 23B, 24B, 25B and 25A. In one embodiment, chiller probe 132 is a thermo-electric cooling device sold under the trade name Ice Probe® manufactured by Coolworks, Inc. In a second embodiment, a cooling panel may be used to chill water in water storage tank 124. In a third embodiment, a refrigerant device may be used to chill water in water storage tank 124.

A first end of water recirculation tube 144 is in communication with the perimeter of water storage tank recirculation port 140 of Water storage tank 124. In one embodiment, first end of water recirculation tube 144 is joined to water storage tank recirculation port 140 with a standard male pipe adapter compression fitting. In a second embodiment, first end of water recirculation tube 144 is joined to water storage tank recirculation port 140 with a barbed fitting. In a third embodiment, first end of water recirculation tube 144 is joined to water storage tank recirculation port 140 with a barbed fitting having a snap retainer ring attached to water recirculation tube 144. In one embodiment, water storage tank recirculation port 140 is located at an elevation between 1 and 2 inches higher than the lowest interior point of water storage tank 124. Water recirculation tube 144 is constructed of material suitable for use with potable water and flexible enough to be deformed in a way that closes the annular space inside the tube. In one embodiment, water recirculation tube 144 is constructed of silicone tubing. In a second embodiment, water recirculation tube 144 is constructed of silicone tubing having a grade of "high purity." In a third embodiment, water recirculation tube 144 is constructed of Tygon® silicone tubing. In one embodiment, water recirculation tube 144 has an internal diameter of approximately 1/16 inch. In a second embodiment, water recirculation tube 144 provides for a water flow rate of approximately 0.041667 gal/min. In a third embodiment, water recirculation tube 144 provides for a water flow rate of approximately 0.035714 gal/nin. In a fourth embodiment, the water flow rate within water recirculation tube 144 is controlled using an inline restrictor valve. In one embodiment, water recirculation tube 144 is secured to water storage tank recirculation port 140 with a threaded circular fitting having an annular space to accommodate flowing water.

Water flow rate within water recirculation tube 144 may be controlled using a flow restrictor pinch valve. In this embodiment, pinch valve 145 is in communication with and encloses water recirculation tube 144. Pinch valve clamp 146 is moveably disposed with pinch valve 145. If power to water generating machine 1 is interrupted, actuator 147 of pinch valve 145 applies force to pinch valve clamp 146 so that water recirculation tube 144 collapses at the location of pinch valve clamp 146, which prevents water from flowing through water recirculation tube 144. In this event, water does not drain from water storage tank 124.

Water recirculation tube 144 is routed through environmental control enclosure 31. Within environmental control enclosure 31, water recirculation tube 144 is in communication with a portion of condensation surface 72. The effect of water recirculation tube 144 in communication with a portion of condensation surface 72 causes water flowing within water recirculation tube 144 to be cooled. As a result, the cooler water inhibits the growth of bacteria in drain port 74 and collector tray 73. In one embodiment, water recirculation tube 144 is wrapped around evaporation coil 71 having condensation surface 72 and remains in place as a result of friction. In one embodiment, the surface area of water recirculation tube 144 in contact with condensation surface 72 is between approximately 1 and 3 square inches. A second end of water recirculation tube 144 is disposed within environmental control enclosure 31 and suspended above collector tray 73.

In one embodiment, water generating machine 1 has dispenser valve 151 in communication with the perimeter of chilled water outlet port 149 of water storage tank 124. Dispenser valve 151 is removably secured to water storage tank 124 with a nut, threaded tubing, or other connection suitable for immersion in potable water. Dispenser valve 151 is constructed of material suitable for use with potable water and has an internal diameter sufficient to allow a water flow rate of 1 GPM at a pressure of 1 atmosphere. Dispenser valve 151 is accessed through dispenser valve port 151A in front panel 3. Chilled water outlet port 149 is located at an elevation between 1 and 8 inches higher than the lowest interior point of water storage tank 124. In one embodiment, chilled water outlet port 149 is located at an elevation of approximately 1 inch higher than the lowest interior point of water storage tank 124. In a second embodiment, chilled water outlet port 149 is located at an elevation of approximately 8 inches higher than the lowest interior point of water storage tank 124. In a third embodiment, dispenser valve 151 is joined to chilled water outlet port 149 with a molded plastic NPT fitting.

In a second embodiment, water generating machine 1 has a dispenser valve 152 in communication with the perimeter of ambient water outlet port 153 of water storage tank 124. Dispenser valve 152 is removably secured to water storage tank 124 with a nut, threaded tubing, or other connection suitable for immersion in potable water. Dispenser valve 152 is constructed of material suitable for use with potable water and has an internal diameter sufficient to allow a water flow rate of 1 GPM at a pressure of 1 atmosphere. Dispenser valve 152 is accessed through dispenser valve port 152A in front panel 3. Ambient water outlet port 153 is located at an elevation between 1 and 8 inches higher than the lowest interior point of water storage tank 124. Ambient water tube 153A is disposed within the interior of water storage tank 124. A first end of ambient water tube 153A is in communication with the perimeter of ambient water outlet port 153 located on the interior side of water storage tank 124. In one embodiment, a first end of ambient water tube 153A is joined to ambient water outlet port 153 with a threaded connection. A second end of ambient water tube 153A is disposed within the interior of water storage tank 124 and terminates at an elevation higher than the lowest interior point of water storage tank 124. If water storage tank 124 is fitted with partition 127, ambient water tube 153A is routed through an opening in partition 127 in order for ambient water tube 153A to terminate at an elevation higher than the elevation of partition 127. In one embodiment, ambient water tube 153A is constructed of rigid nylon plastic, or equivalent. In one embodiment, dispenser valve 152 is joined to ambient water outlet port 153 with a molded plastic NPT fitting.

In a third embodiment, water generating machine 1 incorporates both dispenser valve 151 and dispenser valve 152 operating as previously described.

The combination of compressor 81, evaporation coil 71, condenser coil 81A, and a refrigerant fluid comprises a standard cooling apparatus, which reduces the temperature of condensation surface 72 as compared to the ambient air drawn by rotating fan 63 and eliminates waste heat through condenser coil 81A. In an alternate embodiment, the temperature of condensation surface 72 may be reduced by replacing refrigerant fluid with cooled water or cooled alcohol. In a second alternate embodiment, the combination of compressor 81, evaporation coil 71, condenser coil 81A, and a refrigerant fluid may be replaced with a thermoelectric cooling device in order to reduce the temperature of condensation surface 72.

Figure 10:
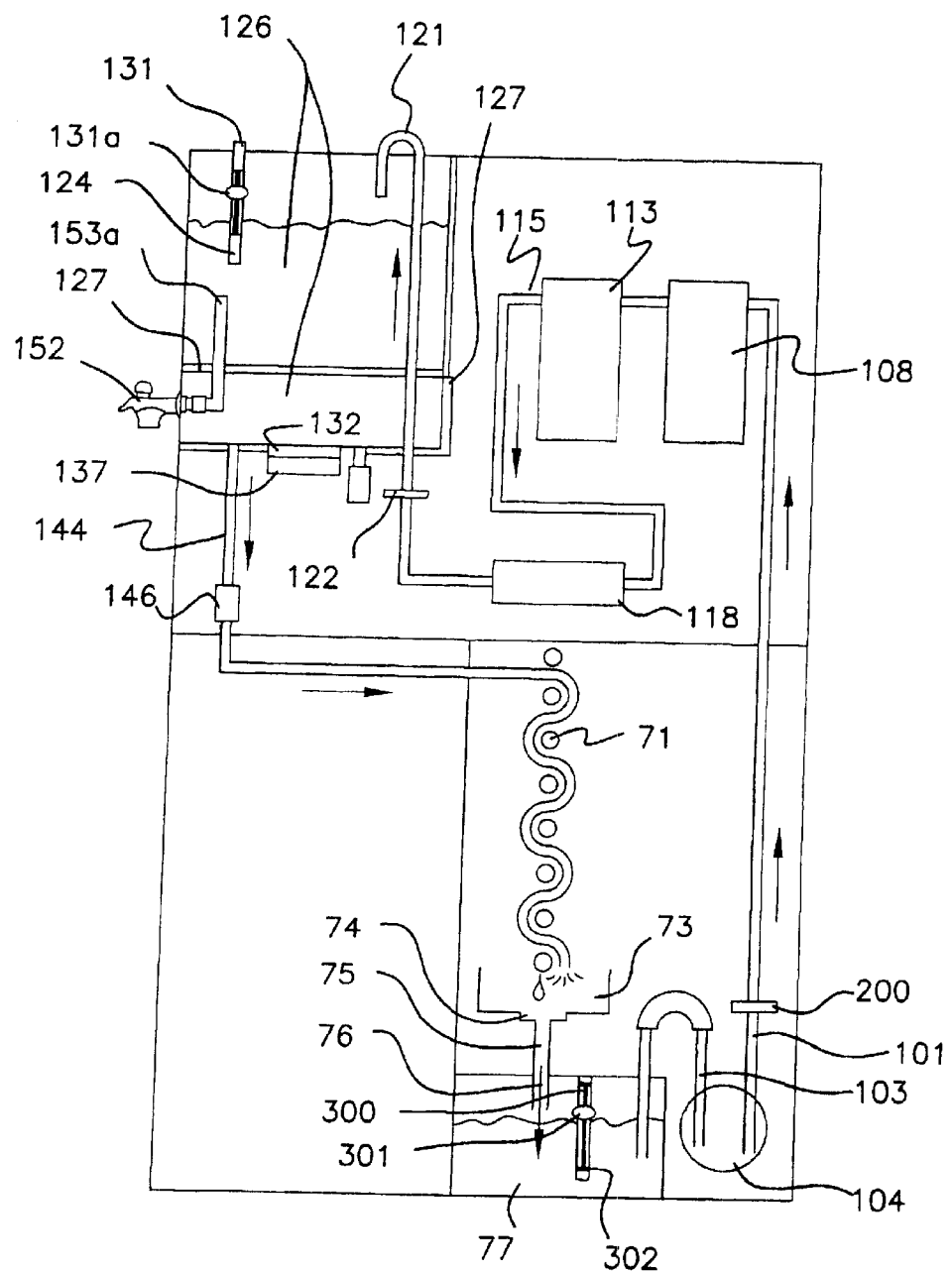
FIG. 10 is a schematic diagram showing the flow of water throughout the water generating machine.
Figure 11:
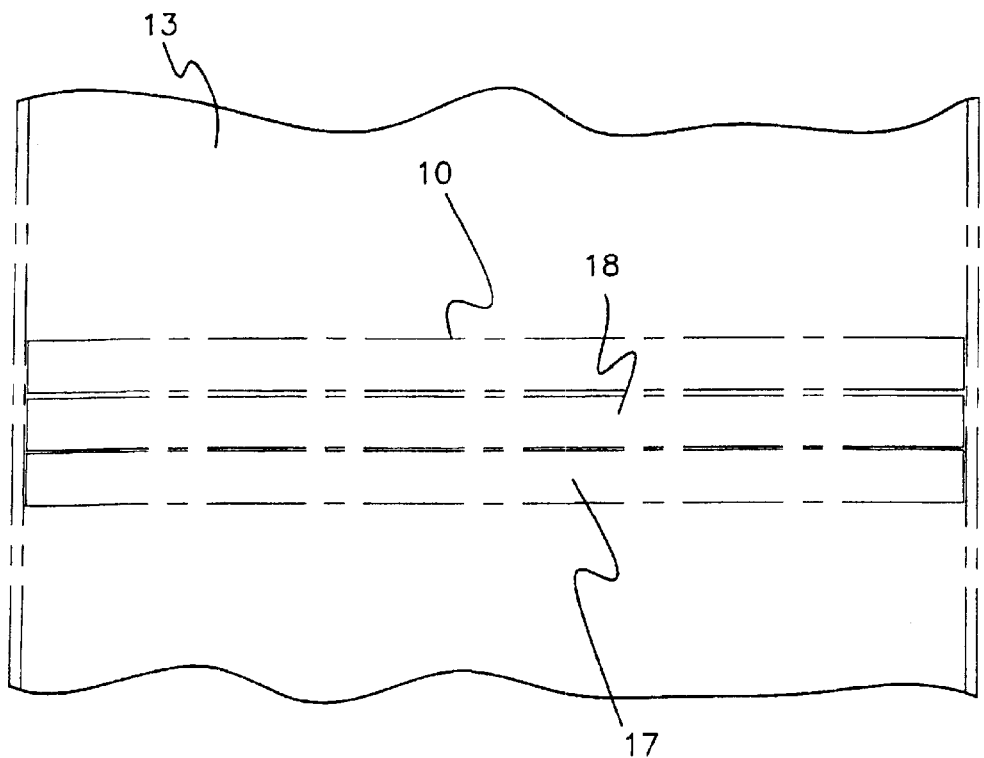
FIG. 11 is a detail view of the upper thermal shield showing an insulation layer disposed entirely within a structural layer.
Figure 12:
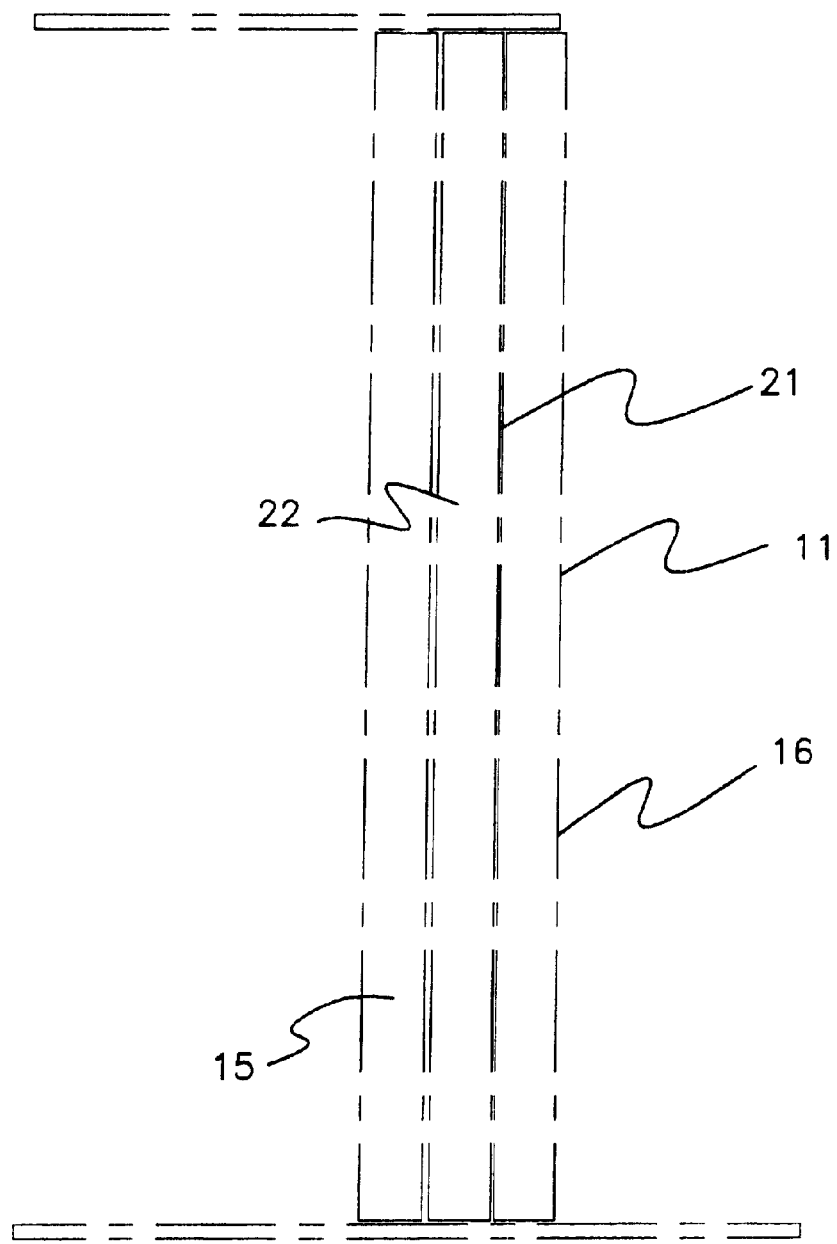
FIG. 12 is a detail view of the lower thermal shield showing an insulation layer disposed entirely within a structural layer.

FIG. 10 provides a schematic view of water flow through water generating machine 1. Liquid water or ice forms on condensation surface 72 of evaporation coil 71. Chilled water drips continuously from condensation surface 72 into collector tray 73 at the bottom of environmental control enclosure 31 where it flows to drain port 74 and into drain port connection tube 75. Under circumstances where water condenses to form ice upon contact with condensation surface 72, compressor 81 is cycled on and off in order to melt the ice to liquid water to be collected in collector tray 73. The water is deposited in pump tank 77 and remains until a water level is reached that triggers float switch 300. Float switch 300 activates pump 104, which draws water through pump tank outlet tube 101 into pump 104 where it is directed through pump outlet tube 105. As water flows through pump outlet tube 105, it passes through lower check valve 200, which prevents water from flowing in a reverse direction, which might otherwise occur once pump 104 stops work. Water flowing through pump outlet tube 105 is directed into upper chamber 13 where it enters charcoal filter housing 108 and passes through charcoal filter 109. Next, water flows through charcoal filter outlet tube 110 into sediment filter housing 113 where it enters sediment filter 114. As water passes through sediment filter 114, particulate carbon deposited in the water as a result of passing through upstream charcoal filter 109 is trapped in sediment filter 114. For this reason, one embodiment of water generating machine 1 has charcoal filter 109 disposed upstream of sediment filter 114. Water then flows through sediment filter outlet tube 115 into sanitization light housing 118, Where it is exposed to sanitization light 120, which eliminates living bacteria by exposing. the water to ultra-violet radiation.

Next, water flows through sanitization light outlet tube 121 and passes through upper check valve 122, which prevents water from flowing in a reverse direction, which might otherwise occur once pump 104 stops work. By preventing water from flowing in a reverse direction, check valve 122 limits contamination to the upstream components in water generating machine 1. Water empties into water storage tank 124 and remains until a high water level is reached that triggers float switch 131. Float switch 131 deactivates water generating machine 1, until a low water level is reached that triggers float switch 131. Float switch 131 then activates water generating machine. Water is directed through water recirculation tube 144, which has a means for restricting water flow. Water is then cooled as it is routed in proximity to condensation surface 72. Water empties into collector tray 73 where it mixes with newly condensed water to be recycled through water generating machine 1. In this manner, water is continuously flowing and cycled through water generating machine 1, which helps maintain water purity and reduces the amount of living bacteria in the water as it flows through Water generating machine 1. In addition, continuous water flow is maintained regardless of whether compressor 81 is operating.

Forced air flows through water generating machine 1. Upon receiving electric power, the fan motor shaft of fan motor 62 rotates causing attached fan 63 to rotate. In one embodiment, fan motor 62 turns at one of two speeds. In one embodiment, fan 63 displaces air at a continuous rate of at least 185 cubic feet per minute. Fan 63 may !e configured as a blade fan, cage fan, box fan, or other suitable fan. In one embodiment, fan 63 is a 9 inch air conditioner blade fan. Rotating fan 63 draws air into air inlet port 26, through primary air filter 27, through secondary air filter 29, and into environmental control enclosure 31 where it contacts condensation surface 72. The air releases water onto condensation surface 72. Next, the air flows out the outlet air opening of environment control enclosure 31, through exit air filter 33, and into condenser coil frame 50 where it contacts condenser coil 81A. The air absorbs heat from condenser coil 81A. Next, the air flows through rotating fan 63, through fan housing 64, into forward chamber 16, and through vents 23, 24 and 25. Since the process of water condensing on condensation surface 72 generates waste heat, rotating fan 63 serves the additional function of removing waste heat from housing 2. For this reason, the rate with which fan 63 displaces air is maintained both to condense water from the ambient flowing air and to cool condenser coil 81A.

While the invention has been particularly shown and described, it will be understood by those skilled in the relevant art that various changes in form and detail may be made without departing from the spirit and scope of this invention.

What is claimed is:

1. A water generating device for producing potable water from ambient air, said device comprising:

a housing having a first compartment, a second compartment and a third compartment;

a water condensing surface positioned within said first compartment;

a cooling apparatus associated with said condensing surface for cooling said condensing surface to a temperature below a dew point of ambient air, a water collector associated with said condensing surface for collecting water from said condensing surface;

a first water storage reservoir connected to said water collector, said first water storage reservoir being positioned in said second compartment; and an air filter structure positioned about said water condensing surface to enclose said water condensing surface, said air filter structure forming a filter barrier surrounding said water condensing surface which isolates said water condensing surface from air within said first compartment.

2. The device of claim 1 further including an air circulating device, said air filter structure being disposed between said water condensing surface and said air circulating device.

3. The device of claim 1 wherein said first compartment is thermally isolated from said second compartment.

4. The device of claim 3 wherein said air circulating device is disposed within said third compartment.

5. The device of claim 4 wherein said first compartment is thermally isolated from said third compartment.

6. The device of claim 5 wherein said third compartment is isolated from said first compartment by a thermal insulation barrier.

7. The device of claim 1 further including a second water storage reservoir interconnected with said first water storage reservoir.

8. The device of claim 7 further including a check valve positioned intermediate said first water storage reservoir and said second water storage reservoir.

9. The device of claim 4 wherein said second water storage reservoir is positioned within said second compartment, said second compartment being thermally isolated from said first compartment.

10. The device of claim 7 further including a water filtering structure in fluid communication with said first water storage reservoir and said second water storage reservoir, said water filtering structure being positioned intermediate said first water storage reservoir and said second water storage reservoir.

11. The device of claim 10 wherein said water filtering stricture includes a charcoal filter, a sediment filter and a sanitation light.

12. The device of claim 11 wherein said charcoal filter is in fluid communication with said sediment filter and said sediment filter is in fluid communication with said sanitation light and said sanitation light is in fluid communication with said second water storage reservoir.

13. The device of claim 4 wherein said second water storage reservoir is impregnated with a silver ion anti-bacterial material.

14. The device of claim 13 further including a check valve positioned intermediate said sanitation light and said second water storage reservoir and in fluid communication with said sanitation light and said second water storage reservoir.

15. The device of claim 7 further including a recirculation apparatus for directing water in said second water storage reservoir to said water collector.

16. The device of claim 1 wherein said second compartment is isolated from said first compartment to preclude unfiltered air from passing from said first compartment to said second compartment.

17. The device of claim 1 wherein said first water storage reservoir is impregnated with a silver ion anti-bacterial material.

18. The device of claim 1 further including a water filtering structure fabricated from a silver ion anti-bacterial material in fluid communication with said first water storage reservoir.

19. A method of producing potable water from ambient air, said method comprising:

providing a water condensing surface;

isolating said water condensing surface from the environment by enclosing said surface with an air filtering apparatus;

providing a cooling apparatus in association with said water condensing surface for cooling said water condensing surface to a temperature below the dew point of ambient air;

associating a water collector with said water condensing surface for collecting water from said water condensing surface;

drawing ambient air through said air filtering apparatus by means of an air circulating apparatus while cooling said water condensing surface by means of said cooling apparatus;

drawing said ambient air out of said air filtering apparatus by means of said air circulating apparatus whereby air exiting said air filtering apparatus is filtered upon exiting said air filtering apparatus.

20. The method of claim 19 further including the step of providing a compartment about said water collector and thermally isolating said compartment from said cooling apparatus.

21. The method of claim 19 further comprising the step of providing a water collector fabricated from a silver ion anti-bacterial material.

22. The method of claim 19 further comprising the step of filtering the water in said water collector by passing said water sequentially through a charcoal filter and subsequently through a sediment filter and a sanitation light.

* * * * *